United States Patent
Po

(10) Patent No.: US 11,659,025 B2
(45) Date of Patent: May 23, 2023

(54) INTERNET OF THINGS SYSTEM AND BACKUP CHANNEL UTILIZATION METHOD THEREOF

(71) Applicants:ACER BEING COMMUNICATION INC., Taipei (TW); Acer Incorporated, New Taipei (TW)

(72) Inventor: Chan-Ping Po, Taipei (TW)

(*) Notice: Subject to any disclaimer, the term of this patent is extended or adjusted under 35 U.S.C. 154(b) by 0 days.

(21) Appl. No.: 17/529,298

(22) Filed: Nov. 18, 2021

(65) Prior Publication Data

US 2022/0191271 A1 Jun. 16, 2022

(30) Foreign Application Priority Data

Dec. 14, 2020 (TW) .................................. 109143992

(51) Int. Cl.
*H04L 67/1034* (2022.01)
*H04L 67/1008* (2022.01)
*H04L 67/142* (2022.01)

(52) U.S. Cl.
CPC ...... *H04L 67/1008* (2013.01); *H04L 67/1034* (2013.01); *H04L 67/142* (2013.01)

(58) Field of Classification Search
CPC ............. H04L 67/1008; H04L 67/1034; H04L 67/142
See application file for complete search history.

(56) References Cited

U.S. PATENT DOCUMENTS

| | | | |
|---|---|---|---|
| 8,514,730 | B2 | 8/2013 | Lee |
| 10,291,477 | B1 | 5/2019 | Askar |
| 10,455,452 | B2 | 10/2019 | Britt et al. |
| 10,715,411 | B1 | 7/2020 | Jacob Da Silva et al. |
| 2016/0198465 | A1 | 7/2016 | Britt et al. |
| 2018/0234519 | A1 | 8/2018 | Boyapalle et al. |
| 2019/0124590 | A1* | 4/2019 | Chiang ............... H04L 12/2809 |
| 2019/0230029 | A1* | 7/2019 | Eswara .................. H04L 45/48 |
| 2021/0007023 | A1* | 1/2021 | Umapathy ...... H04W 36/00837 |

FOREIGN PATENT DOCUMENTS

| | | |
|---|---|---|
| CN | 108293056 | 7/2018 |
| CN | 109150683 | 1/2019 |
| WO | 2017120243 | 7/2017 |

OTHER PUBLICATIONS

"Search Report of Europe Counterpart Application", dated Apr. 21, 2022, p. 1-p. 9.

* cited by examiner

*Primary Examiner* — Ryan J Jakovac
(74) *Attorney, Agent, or Firm* — JCIPRNET

(57) ABSTRACT

An internet of things (IoT) system and a backup channel utilization method thereof are provided. A first network hub device is connected to at least one first IoT device, and a second network hub device is connected to at least one second IoT device. An access point is connected to the first network hub device and the second network hub device. An IoT service server is connected to the first network hub device and the second network hub device through the access point. The first network hub device establishes a connection with the second network hub device through a backup frequency channel in response to that a connection between the first network hub device and the access point is abnormal, and the first IoT device reports IoT data to the IoT service server through the backup frequency channel.

18 Claims, 8 Drawing Sheets

INTERNET OF THINGS SYSTEM AND BACKUP CHANNEL UTILIZATION METHOD THEREOF

CROSS-REFERENCE TO RELATED APPLICATION

This application claims the priority benefit of Taiwan application serial no. 109143992, filed on Dec. 14, 2020. The entirety of the above-mentioned patent application is hereby incorporated by reference herein and made a part of this specification.

BACKGROUND

Technical Field

The invention relates to an Internet of Things (IoT) technology, and particularly relates to an IoT system and a backup channel utilization method thereof.

Description of Related Art

In recent years, along with evolution and innovation of technology, things that may be connected to the Internet are no longer limited to computer devices or personal mobile communication devices, more and more IoT devices may report sensing data or interact with an application service platform through various communication technologies. For example, artificial intelligence, big data collection and analysis, and blockchain may all be able to achieve more innovations and industrial applications with the support of IoT technology. For example, in environmental monitoring, smart factory, smart transportation, smart home, smart agriculture, health care, smart life, etc., the IoT application services may be seen everywhere. On the other hand, along with progress and development of cloud computing technology, artificial intelligence and big data applications, a scale and application scope of the IoT are growing rapidly, which is expected to achieve 50 billion IoT devices by 2020.

Along with the huge increasing number of the IoT devices, a base station and a backhaul network in a current telecommunication network framework may have a heavy burden. In other words, when a number of connected devices around the base station is growing rapidly, limited by a bandwidth limitation of the backhaul network and a processing capacity of the base station, the base station and the backhaul network in the existing telecommunication network framework may be overloaded.

In other words, along with the huge increase in the number of the IoT devices, a fairly reliable and stable communication network framework is required to serve as a support so that various application services using the IoT technology may obtain correct data from the IoT devices. Otherwise, without correct data, even an excellent IoT application service cannot realize its powerful and convenient application functions. Namely, a reliable network transmission environment is a necessary condition for the IoT application services. In order to ensure that the IoT devices may report data correctly, many network issues need to be considered, such as a coverage range of wireless signal, communication bandwidth limitations, communication quality, data collisions, information security issues, etc.

Therefore, along with the increasing number of the IoT devices, there are actually many challenges in providing a reliable network transmission environment for the IoT services. Therefore, how to provide the reliable network transmission environment for the IoT services has become a very important and widely discussed issue.

SUMMARY

Therefore, the invention is directed to an Internet of Things (IoT) system and a backup channel utilization method thereof, which make data transmission of IoT more reliable.

An embodiment of the invention provides an IoT system including a first network hub device, a second network hub device, at least one access point, and an IoT service server. The first network hub device is connected to at least one first IoT device, and the second network hub device is connected to at least one second IoT device. The access point is connected to the first network hub device and the second network hub device. The IoT service server is connected to the first network hub device and the second network hub device through the access point. The first network hub device establishes a connection with the second network hub device through a backup frequency channel in response to that a connection between the first network hub device and the access point is abnormal, and the first IoT device reports IoT data to the IoT service server through the backup frequency channel between the first network hub device and the second network hub device.

According to another aspect, an embodiment of the invention provides a backup channel utilization method, which is adapted to an IoT system. The above method includes following steps. A connection between at least one first IoT device and a first network hub device is established, and a connection between the first network hub device and at least one access point is established. A connection between at least one second IoT device and a second network hub device is established, and a connection between the second network hub device and the at least one access point is established. The first network hub device establishes a connection with the second network hub device through a backup frequency channel in response to that the connection between the first network hub device and the at least one access point is abnormal. IoT data of the first IoT device is reported to an IoT service server through the backup frequency channel between the first network hub device and the second network hub device.

Based on the above description, in the embodiments of the invention, by deploying multiple network hub devices between the IoT devices and a base station, the load on the base station and a backhaul network may be greatly reduced. When the connection between a certain network hub device and the base station is abnormal, the network hub device may be connected to another network hub device through the backup frequency channel, so that the IoT data of a plurality of IoT devices managed by the network hub device may be reported to the IoT service server as soon as possible through the backup frequency channel and the another network hub device. In this way, a success rate and reliability of reporting the IoT data are greatly improved.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
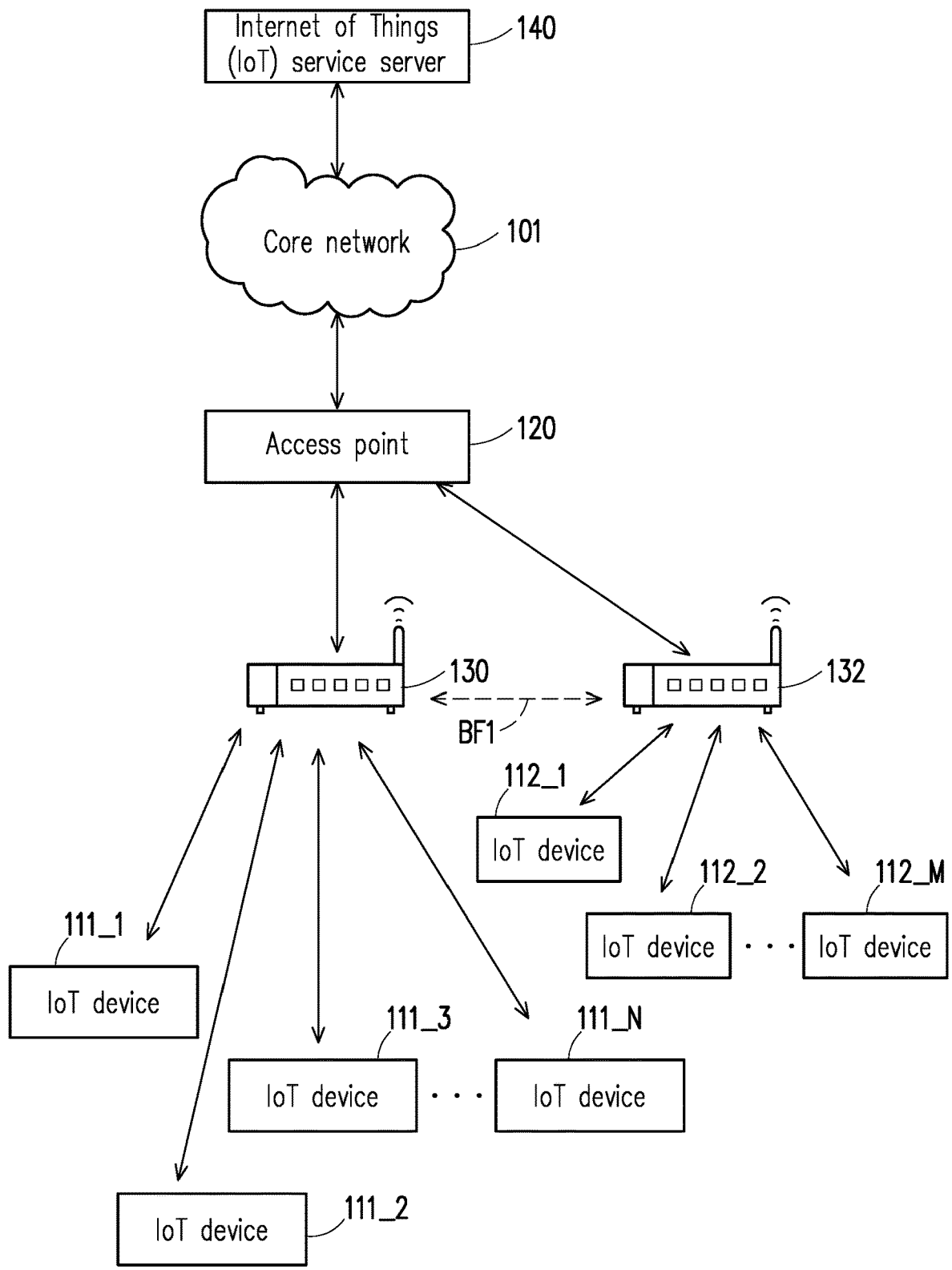
FIG. 1 is a schematic diagram of an IoT system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts. Theses exemplary embodiments are only a part of the invention, and the invention does not disclose all of the implementations. More precisely, these exemplary embodiments are only examples of the system and method in the claims of the invention.

FIG. 1 is a schematic diagram of an IoT system according to an embodiment of the invention. Referring to FIG. 1, the IoT system 10 includes a plurality of network hub devices 131 and 132, an access point 120, and an IoT service server 140.

The network hub devices 131, 132 are respectively connected to a group of IoT devices. The network hub device 131 (i.e., a first network hub device) is connected to N IoT devices 111_1-111_N (i.e., first IoT devices), where N is an integer greater than or equal to 1. The network hub device 132 (i.e., a second network hub device) is connected to M IoT devices 112_1-112_M (i.e., second IoT devices), where M is an integer greater than or equal to 1.

The network hub devices 131 and 132 are connected between the access point 120 and the IoT devices 111_1-111_N and 112_1-112_M. To be specific, the IoT devices 111_1-111_N and 112_1-112_M may establish communication connections with the network hub devices 131 and 132 through wired or wireless communication standards. For example, the IoT devices 111_1-111_N and 112_1-112_M may establish communication connections with the network hub devices 131 and 132 through a WiFi standard, a Bluetooth standard, a ZigBee wireless communication standard, a long range (LoRa) standard, an Ethernet standard, a RS485 standard or other communication standards, but the invention is not limited thereto.

The IoT devices 111_1-111_N and 112_1-112_M have a networking function, which may communicate with other electronic devices through wired or wireless communication technologies. In one embodiment, the IoT devices 111_1-111_N and 112_1-112_M may report sensing data, measurement data, or other types of data to the IoT service server 140. In various applications of IoT, the IoT devices 111_1-111_N and 112_1-112_M may be implemented by general electronic devices, for example, the IoT devices 111_1-111_N and 112_1-112_M may be household appliances, air conditioning equipment, or illumination equipment, etc. Alternatively, the IoT devices 111_1-111_N and 112_1-112_M may also be environmental monitoring devices with one or more sensors for sensing temperature, humidity, air pressure, gas, ultraviolet ray, etc., or the IoT devices 111_1-111_N and 112_1-112_M may also be various measuring instruments, such as water meters, gas meters, electric meters, etc. However, the IoT devices 111_1-111_N and 112_1-112_M in the embodiment are not limited to the above examples.

The access point 120 is connected to a core network 101, and is configured to provide wireless or wired communication services to the IoT devices 111_1-111_N and 112_1-112_M. In the invention, the term "access point" may refer to various embodiments. For example, the access point 120 may be a base station deployed by a telecommunication network operator, such as a WiMAX base station, a GSM wireless base transceiver station (BTS), a universal mobile telecommunication system (UMTS), a base station (node B), an LTE evolved base station (eNB), a 5G base station (gNB) or a base station supporting other wireless communication standards. According to another aspect, the access point 120 may be a macro cell base station, a micro cell base station, a pico cell base station, a femto cell base station, which is not limited by the invention. In addition, the access point 120 may also be a digital subscriber line (DSL) modem, a cable modem, or a gateway, etc., deployed by an Internet provider, which is not limited by the invention.

Moreover, the network hub devices 131 and 132 may be connected to the access point 120 through a wired or wireless communication standard. For example, the network hub devices 131 and 132 may be connected to the access point 120 through a WiFi standard, a long-range (LoRa) standard, an Ethernet standard, a narrow band IoT (NB-IoT) standard, an LTE standard, a 5G standard, or other communication standards, which is not limited by the invention. In an embodiment, the network hub devices 131 and 132 may also be used as wired or wireless signal relay stations to expand a scope of communication service, so that deployment locations of the IoT devices 111_1-111_N and 112_1-112_M are not limited to a geographical location of the access point 120. In addition, in FIG. 1, a situation that the network hub devices 131 and 132 may be connected to the same access point 120 is taken as an example for description, but the invention is not limited thereto. In other embodiments, the network hub devices 131 and 132 may be connected to different access points.

It should be noted that in an application of the IoT service, the IoT devices 111_1-111_N and 112_1-112_M need to report IoT data to the IoT service server 140 or receive control commands from the IoT service server 140. In an embodiment, the IoT devices 111_1-111_N and 112_1-112_M may be respectively connected to the access point 120 through the network hub devices 131 and 132, so as to report the IoT data to the IoT service server 140 or receive control commands from the IoT service server 140 through the core network 101. Namely, in an embodiment, the network hub devices 131 and 132 may be regarded as IoT hubs set for the IoT devices 111_1-111_N and 112_1-112_M. Through the bridging of the network hub device 131, a plurality of IoT devices 111_1-111_N may simultaneously use the communication service provided by a telecommunication network operator or an Internet provider.

In an embodiment, the network hub devices 131 and 132 may be used to manage the IoT devices 111_1-111_N and 112_1-112_M. In other words, the network hub devices 131 and 132 may respectively arrange different frequency channels and/or different data reporting periods for the IoT devices 111_1-111_N and 112_1-112_M, so as to prevent data collision of the IoT devices 111_1-111_N and 112_1-112_M during reporting, thereby reducing a probability of data loss. By using the network hub devices 131 and 132 to schedule communication resources of the IoT devices 111_1-111_N and 112_1-112_M, a burden on the access point 120 and a backhaul network may be effectively reduced, which mitigates network congestion caused by connections of a large number of the IoT devices 111_1-111_N and 112_1-112_M and reduces the probability of data collision, thereby constructing a reliable network environment for the IoT system 10.

It should be noted that, in an embodiment, in response to abnormity of a connection between the network hub device 131 and the access point 120, the first network hub device 131 may establish a connection with the second network hub device through a backup frequency channel BF1. Therefore, when the IoT devices 111_1-111_N cannot report the IoT data through the connection between the network hub device 131 and the access point 120, the IoT devices 111_1-111_N may report the IoT data to the IoT service server 140 through the backup frequency channel BF1 between the network hub device 131 and the network hub device 132. For example, the backup frequency channel BF1 between the network hub device 131 and the network hub device 132 may be a frequency channel in a LoRa protocol.

Figure 2A:
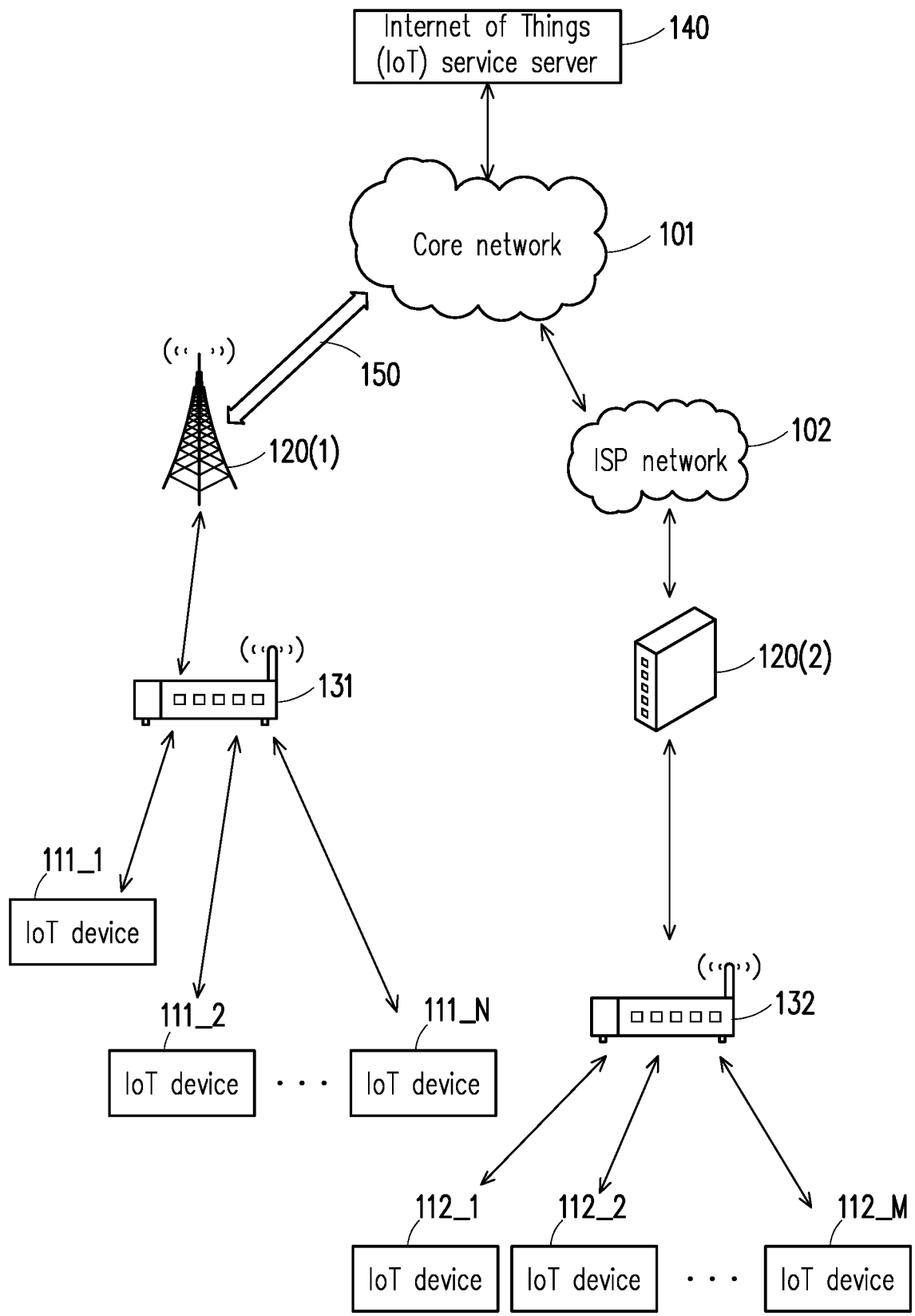
FIG. 2A and FIG. 2B are schematic diagrams of applications of an IoT system according to an embodiment of the invention.
Figure 2B:
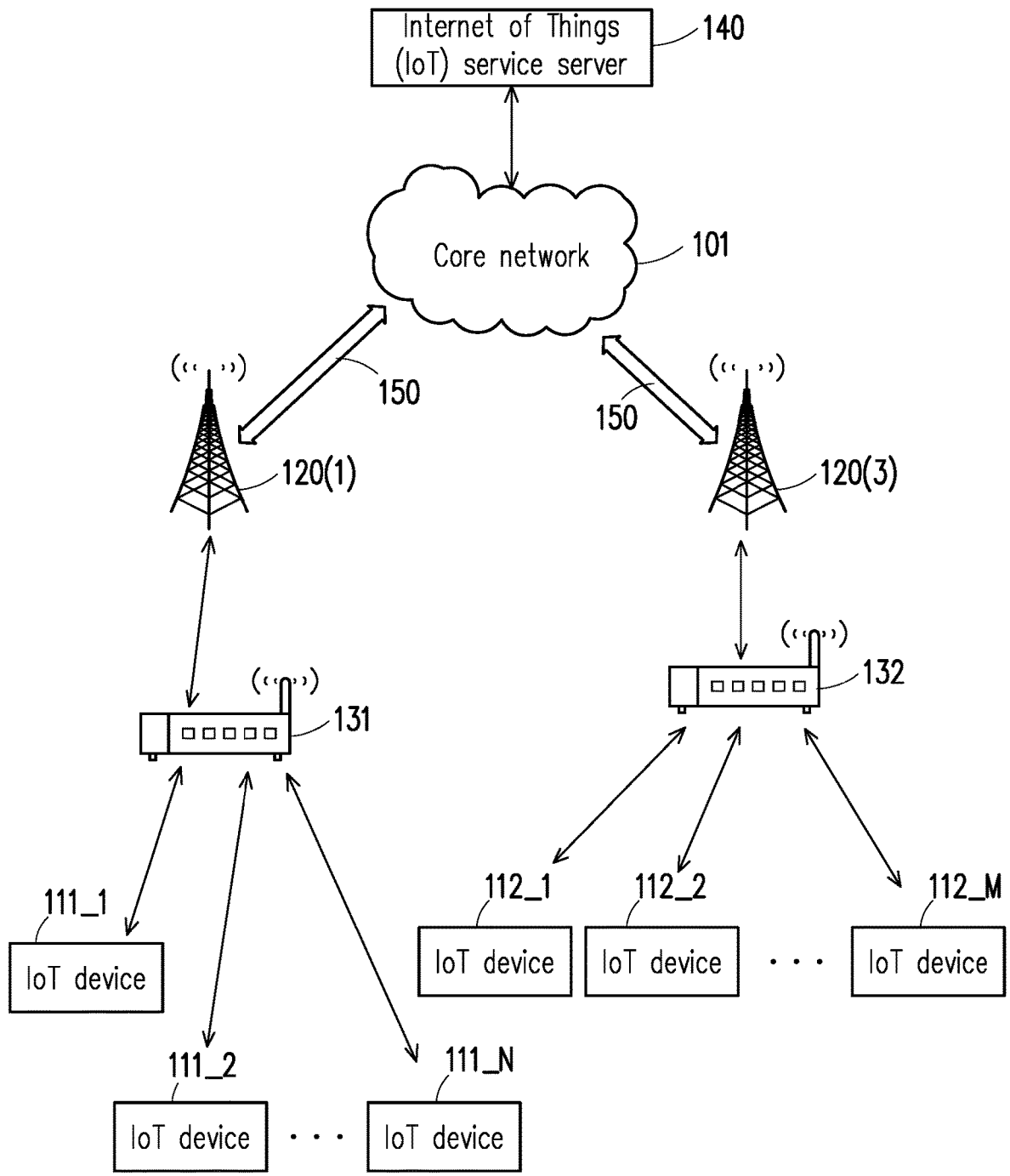

FIG. 2A and FIG. 2B are schematic diagrams of applications of an IoT system according to an embodiment of the invention. Referring to FIG. 2A, FIG. 2A illustrates an implementation mode where the access point 120 includes a radio base station 120(1) and an Internet modem 120(2). The IoT devices 111_1-111_N may be connected to the network hub device 131, and the network hub device 131 may be connected to the radio base station 120(1). To be specific, the network hub device 131 is located within a wireless signal coverage range of the radio base station 120(1) to establish a wireless connection with the radio base station 120(1). The radio base station 120(1) is connected to the core network 101 through a backhaul network 150 of a telecommunication network operator. For example, the radio base station 120(1) may be connected to a serving gateway (SGW) or a mobility management entity (MME) in the core network 101 through the backhaul line 150. In this way, the IoT devices 111_1-111_N may communicate with the IoT service server 140 through the network hub device 131, the radio base station 120(1), the backhaul network 150, and the core network 101. In addition, it should be noted that for the sake of clear description, in FIG. 2A, only the situation that one network hub device 131 is connected to the radio base station 120(1) is taken as an example for description, but the invention is not limited thereto. In an embodiment, the radio base station 120(1) may be connected to a plurality of network hub devices, and these network hub devices are respectively connected to a corresponding group of IoT devices.

On the other hand, the IoT devices 112_1-112_M may be connected to the network hub device 132, and the network hub device 132 may be connected to the modem 120(2). To be specific, the network hub device 132 may be connected to the modem 120(2) through a transmission cable, so as to establish a wired communication connection. The modem 120(2) may be connected to network equipment serving as an access port of an ISP network 102, such as a digital subscriber line access multiplexer (DSLAM) or an optical line terminal (OLT), etc. The network equipment serving as the access port of the ISP network 102 may be connected to a network routing node in the ISP network 102 through a backhaul network, so that the modem 120(2) is connected to the core network 101 through the ISP network 102. In this way, the IoT devices 112_1-112_M may communicate with the IoT service server 140 through the network hub device 132, the modem 120(2), and the core network 101. In addition, it should be noted that for the sake of clear description, in FIG. 2A, only the situation that one network hub device 132 is connected to the modem 120(2) is taken as an example for description, but the invention is not limited thereto. In an embodiment, the modem 120(2) may be connected to a plurality of network hub devices, and these network hub devices are respectively connected to a corresponding group of IoT devices.

Referring to FIG. 2B. FIG. 2B illustrates an implementation mode where the access node 120 includes the radio base station 120(1) and a radio base station 120(3). Compared to FIG. 2A, the network hub device 132 may be connected to the radio base station 120(3). To be specific, the network hub device 132 is located within a wireless signal coverage range of the radio base station 120(3) to establish a wireless connection with the radio base station 120(3). In this way, the IoT devices 112_1-112_M may communicate with the IoT service server 140 through the network hub device 132, the radio base station 120(3), the backhaul network 150, and the core network 101.

Figure 3:
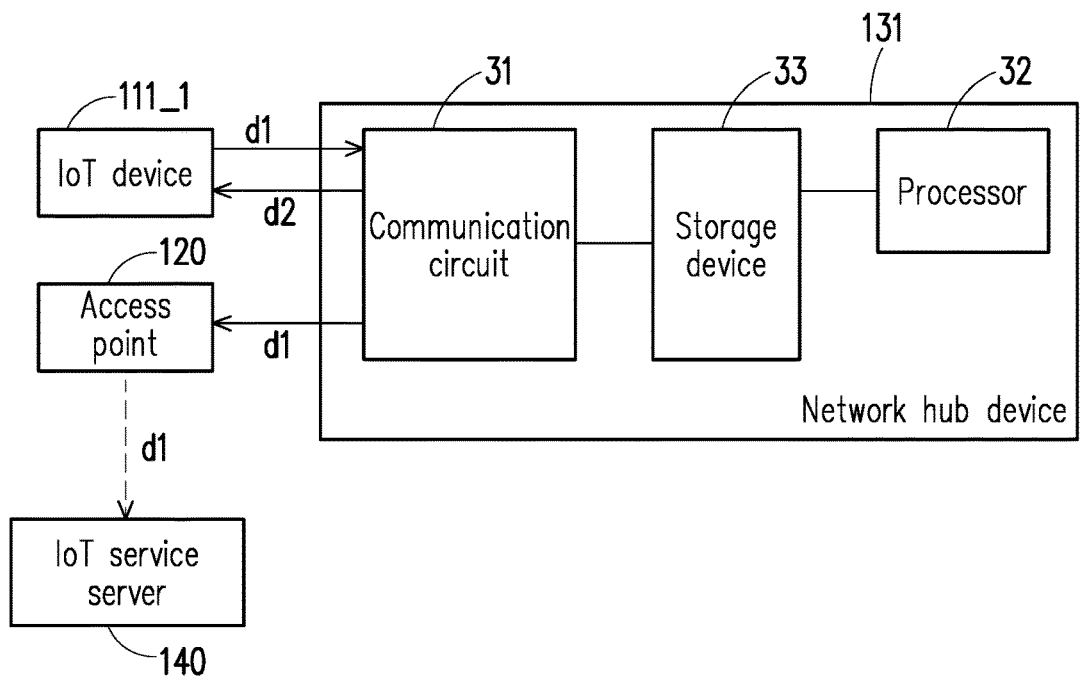
FIG. 3 is a block schematic diagram of a network hub device according to an embodiment of the invention.

It should be noted that functions and hardware configurations of the network hub devices 131 and 132 are substantially the same, so that the network hub device 131 is taken as an example for description, and those with ordinary knowledge in the field should be able to deduce the function and hardware configuration of the network hub device 132 based on relevant teachings. FIG. 3 is a block schematic diagram of a network hub device according to an embodiment of the invention. Referring to FIG. 3, the network hub device 131 includes a communication circuit 31, a storage device 32, and a processor 33.

The network hub device 131 may support one or a plurality of wired/wireless communication standards, and the communication circuit 31 may include components that support one or a plurality of wired/wireless communication standards. For example, the communication circuit 31 may be an electronic component supporting the RS485 standard, the LTE standard, the 5G standard, the Wi-Fi standard, the LoRa standard, or the Bluetooth standard, which is not limited by the invention. Namely, the communication circuit 31 may include a wireless transceiver, an antenna, or a wired signal transmission port, etc. The communication circuit 31 may establish communication connections with the IoT devices 111_1-111_N and the access point 120 according to one or a plurality of wired/wireless communication standards.

The storage device 32 is configured to store cache data or permanent data such as data, device configurations, program codes, software components, etc., which is, for example, any type of fixed or movable random access memory (RAM), read-only memory (ROM), flash memory (flash memory) or other similar devices, integrated circuits and combinations thereof.

The processor 33 is coupled to the communication circuit 31 and the storage device 32, which may be a programmable general-purpose or special-purpose microprocessor, a digital signal processor (DSP), a programmable controller, an application specific integrated circuit (ASIC) or other similar components or a combination of the above components. The processor 33 may execute program codes stored in the storage device 32 and access data recorded in the storage device 32 to implement any function that may be executed by the network hub device 131 in the invention.

Referring to FIG. 3, in an embodiment, taking the IoT device 111_1 as an example, the IoT device 111_1 may report IoT data d1 to the IoT service server 140 through the network hub device 131, and the IoT data d1 may include sensing data, measurement data or other data, etc. For example, the IoT data d1 may include electric meter readings, water meter readings, a brightness sensing value or water condition measurement data, etc. It should be noted that, in one embodiment, the network hub device 131 may dynamically schedule communication resources for the IoT devices 111_1-111_N, and the IoT devices 111_1-111_N may report the IoT data d1 according to communication policy rules determined by the network hub device 131 to avoid network congestion and data collision. In an embodiment, the network hub device 131 may send a parameter configuration command d2 to the IoT device 111_1 to dynamically adjust communication parameters of the IoT device 111_1, so that the IoT device 111_1 reports the IoT data d1 according to the communication policy rules determined by the network hub device 131. The aforementioned communication parameters may include a quality of service (QoS) parameter, a frequency channel, a data reporting period, or a combination thereof. Interactions between the network hub device 131 and the other IoT devices 111_2-111_N are similar to the aforementioned description, which are not repeated. Similarly, the interactions between the network hub device 132 and the IoT devices 112_2-112_M are similar to the aforementioned description, which are not repeated.

Figure 4:
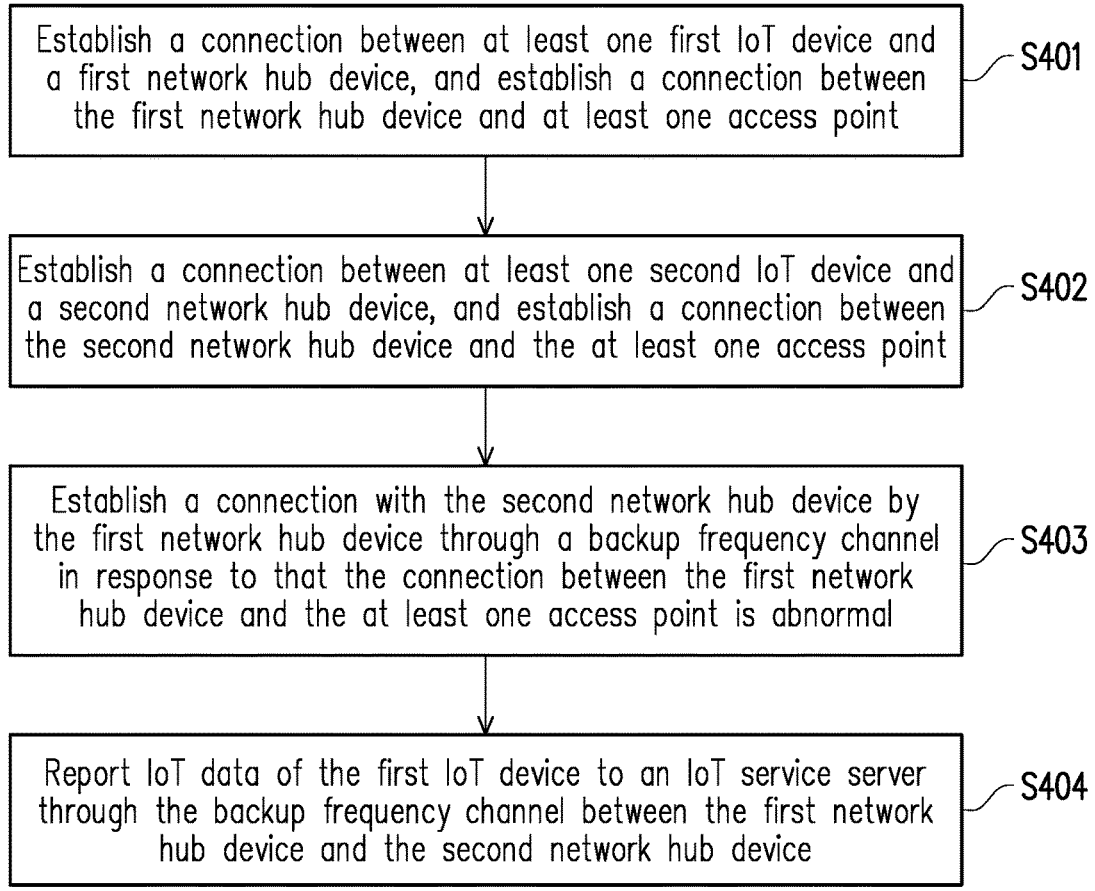
FIG. 4 is a flowchart of a communication method of an IoT system according to an embodiment of the invention.

FIG. 4 is a flowchart of a communication method of an IoT system according to an embodiment of the invention. Referring to FIG. 4, the method of the embodiment is adapted to the IoT system 10 of the aforementioned embodiment. Detailed steps of the embodiment are described below with reference of various components in the IoT system 10.

In step S401, a connection between the IoT devices 111_1-111_N and the network hub device 131 is established, and a connection between the network hub device 131 and the access point 120 is established. The method of establishing the connections between the IoT devices 111_1-111_N, the network hub device 131 and the access point 120 has been described in the aforementioned embodiment, which is not repeated.

In step S402, a connection between the IoT devices 112_1-112_M and the network hub device 132 is established, and a connection between the network hub device 132 and the access point 120 is established. The method of establishing the connections between the IoT devices 112_1-112_N, the network hub device 132 and the access point 120 has been described in the aforementioned embodiment, which is not repeated.

In step S403, the network hub device 131 establishes a connection with the network hub device 132 through a backup frequency channel BF1 in response to that the connection between the network hub device 131 and the access point 120 is abnormal. Factors such as failure of the access point 120, failure of the network hub device 131, shielding of obstacles or poor weather conditions, etc., may all cause interruption or abnormity of the connection between the network hub device 131 and the access point 120. The network hub device 131 may automatically detect whether the connection with the access point 120 is normal.

In one embodiment, the network hub devices 131, 132 may set one or a plurality of backup frequency channels in a plurality of applicable channels. For example, in the LoRa standard, a bandwidth of one applicable channel is, for example, 12 5 kHZ or 250 kHZ, etc. The network hub devices 131 and 132 will not allocate the backup frequency channels to the IoT devices 111_1-111_N, 112_1-112_M for reporting the IoT data. The backup frequency channels may be used to send and receive signals and messages to/from other network hub devices. When the connection between the network hub device 131 and the access point 120 is abnormal, the network hub device 131 is not able to report the IoT data to the IoT service server 140 through the access point 120. Therefore, when the network hub device 131 detects that the connection with the access point 120 is abnormal, the network hub device 131 may send a connection request to the network hub device 132 through the backup frequency channel BF1. The network hub device 132 may listen to whether the backup frequency channel BF1 has connection requests from other network hub devices. In response to receiving the connection request through the backup frequency channel BF1, the network hub device 132 may establish a connection with the network hub device 131 through the backup frequency channel BF1.

Then, in step S404, the IoT devices 111_1-111_N report the IoT data of the IoT devices 111_1-111_N to the IoT service server 140 through the backup frequency channel BF1 between the network hub device 131 and the network hub device 132. In detail, the IoT devices 111_1-111_N may send the IoT data to the network hub device 131, and the network IoT device 131 transmits the IoT data of the IoT devices 111_1-111_N to the network hub device 132 through the backup frequency channel BF1. Then, the network hub device 132 transmits the IoT data of the IoT devices 111_1-111_N to the IoT service server 140 through the access point 120, so that the IoT service server 140 may obtain the IoT data of the IoT devices 111_1-111_N. In this way, when the connection between the network hub device 131 and the access point 120 is interrupted or abnormal, the IoT data of the IoT devices 111_1-111_N may be reported to the IoT service server 140 through the backup frequency channel BF1, which greatly increases reliability and a success rate of reporting the IoT data.

It should be noted that when the connection between the network hub device 131 and the access point 120 is abnormal, the IoT service server 140 cannot send a control message to the IoT devices 111_1-111_N through the connection between the network hub device 131 and the access point 120. In one embodiment, after the network hub device 131 establishes the connection with the network hub device 132 through the backup frequency channel BF1, the IoT service server 140 may send the control message to the IoT devices 111_1-111_N through the backup frequency channel BF1 between the network hub device 131 and the network hub device 132. In other words, since the network hub device 131 may be connected to the network hub device 132 through the backup frequency channel BF1, the IoT service server 140 may send the control message to the network hub device 132, and then the network hub device 132 may transfer the control message to the IoT devices 111_1-111_N through the backup frequency channel BF1.

In an embodiment, in response to that the network hub device 131 establishes the connection with the network hub device 132 through the backup frequency channel BF1, the network hub device 132 sends a notification message to the IoT service server 140 through the access point 120 to notify the IoT service server 140 to adjust contact information of the IoT devices 111_1-111_N. In an embodiment, the IoT service server 140 may adjust a packet destination of the control message sent to the IoT devices 111_1-111_N from a network address of the network hub device 131 to a network address of the network hub device 132 to avoid the situation that the control message cannot be transmitted to the IoT devices 111_1-111_N.

In an embodiment, the control message sent by the IoT service server 140 is, for example, a parameter update message. When the IoT devices 111_1-111_N has a need of software/firmware update or other parameter update, the IoT service server 140 may send a parameter update message to the network hub device 132. The network hub device 132 may transfer the parameter update message to the network hub device 131 through the backup frequency channel BF1, and then the network hub device 131 assigns the parameter update message to the IoT devices 111_1-111_N to drive the IoT devices 111_1-111_N to perform update setting operations according to the parameter update message. Namely, the IoT service server 140 does not need to send N parameter update messages to drive the IoT devices 111_1-111_N one-by-one to perform the update setting operation, but sends one parameter update message to the network hub device 132 to drive all of the IoT devices 111_1-111_N to perform the update setting operations. In this way, the burden on the access point 120 and the backhaul network may be greatly reduced.

In an embodiment, the network hub device 131 may select the network hub device 132 from a plurality of neighboring network hub devices according to location information or load states of the neighboring network hub devices. To be specific, in addition to the network hub devices 131 and 132, the IoT system 10 may also include other network hub devices. According to a wireless signal coverage range of the network hub device 131, in addition to the network hub device 132, the network hub device 131 is also capable of establishing connections with other network hub devices through the backup frequency channel. However, considering connection quality and balancing of the loads of the network hub devices, the network hub device 131 may select the network hub device 132 from the neighboring network hub devices according to the location information or the load states of the neighboring network hub devices. For example, the network hub device 131 may select the network hub device 132 with the closest geographic location from the neighboring network hub devices to establish a backup channel connection. Alternatively, the network hub device 131 may select the network hub device 132 with the least amount of load from the neighboring network hub devices to establish a backup channel connection. The aforementioned amount of load may include an amount of packet transmission load or a number of connections of the IoT devices, etc.

In an embodiment, in response to that the network hub device 131 establishes a connection with the network hub device 132 through the backup frequency channel BF1, the network hub device 132 may adjust data reporting periods or/and frequency channels assigned to the IoT devices 111_1-111_N or/and the IoT devices 112_1-112_M. The data reporting period, for example, has a unit of time slot, and different data reporting periods correspond to different time slots. In this way, data loss caused by simultaneous transmission of a large amount of IoT data of the IoT devices 111_1-111_N and the IoT data of the IoT devices 112_1-112_M to the network hub device 132 is avoided.

Figure 5A:
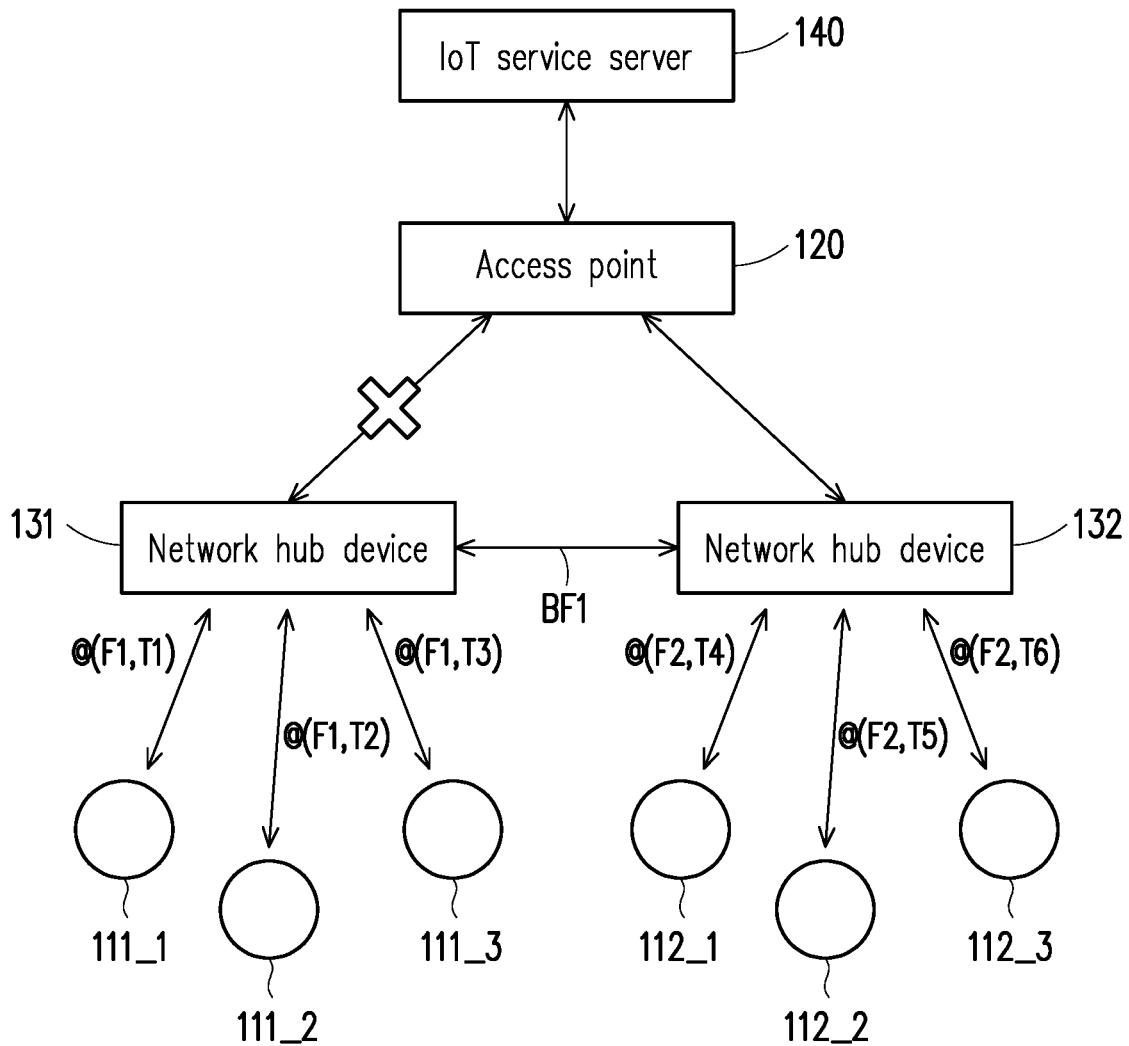
FIG. 5A and FIG. 5B are schematic diagrams of adjusting data reporting periods of IoT devices according to an embodiment of the invention.
Figure 5B:
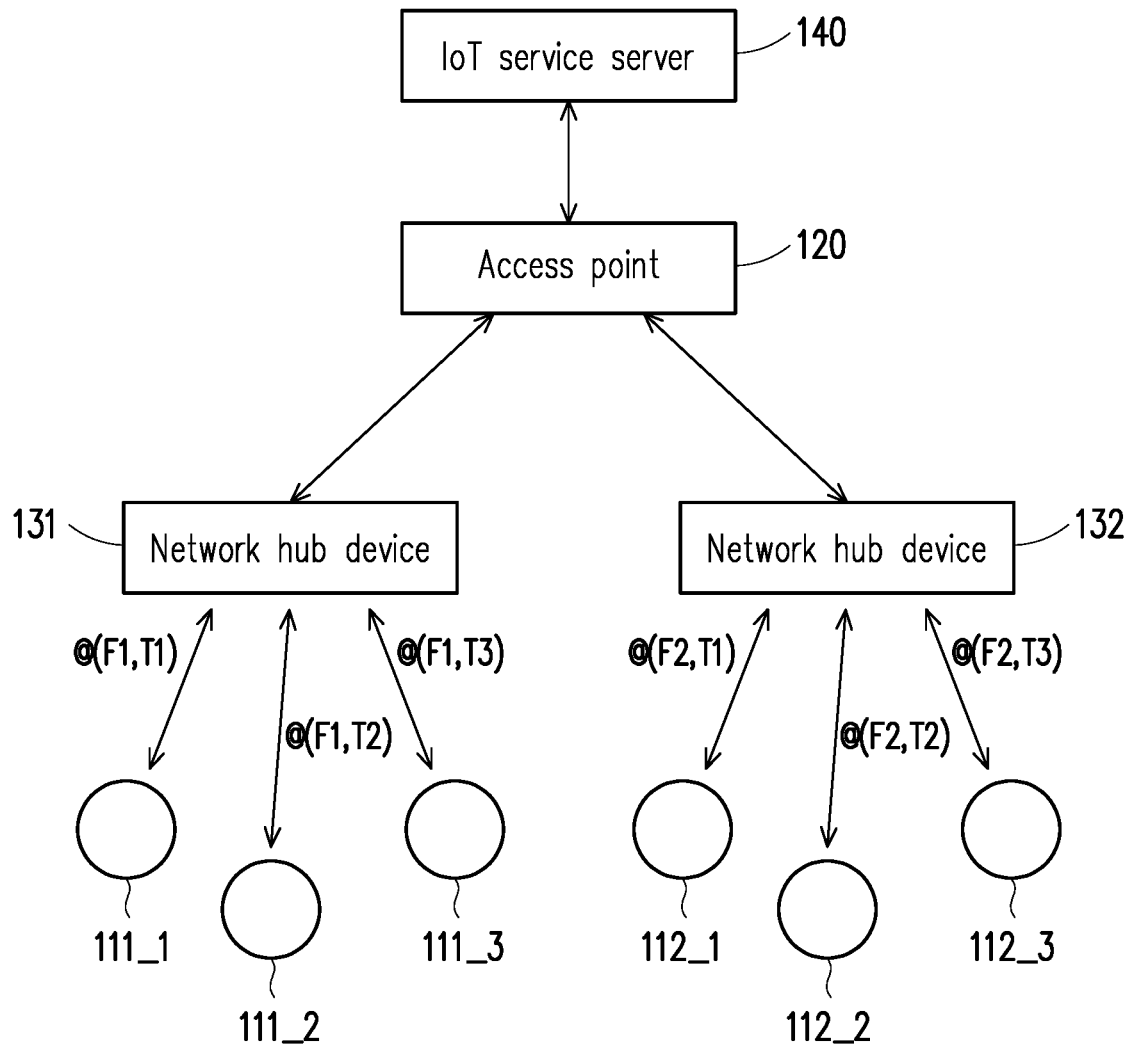

For example, FIG. 5A and FIG. 5B are schematic diagrams of adjusting data reporting periods of the IoT devices according to an embodiment of the invention. It should be noted that in the following description, the IoT device 131 is, for example, used to manage and connect to the IoT devices 111_1-111_3 and the IoT device 132 is used to manage and connect to the IoT devices 112_1-112_3.

Referring to FIG. 5A first, taking the IoT device 111_1 and the IoT device 112_1 as an example, after the network hub device 131 is connected to the network hub device 132 through the backup frequency channel BF1, the network hub device 132 assigns a first frequency channel F1 and a first data reporting period T1 to the IoT device 111_1 and assigns a second frequency channel F2 and a second data reporting period T4 to the IoT device 112_1, so as to control the IoT device 111_1 to use the first frequency channel F1 during the first data reporting period T1 to report the IoT data and control the IoT device 112_1 to use the second frequency channel F2 during the second data reporting period T4 to report the IoT data. In an embodiment, the first data reporting period T1 of the IoT device 111_1 is different from the second data reporting period T4 of the IoT device 1121. Similarly, the network hub device 132 respectively assigns the first frequency channel F1 and first data reporting periods T2 and T3 to the IoT devices 111_2 to 111_3, and respectively assigns the second frequency channel F2 and second data reporting periods T5 and T6 to the IoT devices 112_2 to 112_3. The first data reporting periods T1, T2, and T3 of the IoT devices 111_1-111_3 are different from the second data reporting periods T4, T5, and T6 of the IoT devices 112_1-112_3. As shown in FIG. 5A, the time when the IoT devices 111_1-111_3 report the IoT data and the time when the IoT devices 112_1-112_3 report the IoT data are staggered, so that the problem of network congestion or data loss may be avoided.

In an embodiment, in response to that the network hub device 131 establishes a connection with the network hub device 132 through the backup frequency channel BF1, since the IoT data of the IoT devices 111_1-111_3 needs to be sent to the access point 120 through the network hub device 132, the IoT devices 111_1-111_3 are also included in a management group of the network hub device 132. The network hub device 132 may dynamically adjust the first frequency channel and the first data reporting periods of the IoT devices 111_1-111_3 and the second frequency channel and the second data reporting periods of the IoT devices 112_1-112_3 according to data reporting states of the IoT devices 111_1-111_3 and data reporting states of the IoT devices 112_1-112_3. In detail, in an embodiment, the network hub device 132 may monitor the data reporting states of the IoT devices 111_1-111_3 and 112_1-112_3, and dynamically allocate communication resources to the IoT devices 111_1-111_3 and 112_1-112_3. The data report state is, for example, a data transmission frequency, etc. As described above, the network hub device 132 may dynamically adjust QoS parameters, frequency channels, data reporting periods, or other parameters of the IoT devices 111_1-111_3 and 112_1-112_3. In an embodiment, the QoS parameters include a transmission priority order of the IoT devices 111_1-111_3 and 112_1-1123, i.e., the network hub device 132 may dynamically adjust the transmission priority order of the IoT devices 111_1-111_3 and 112_1-112_3. Alternatively, in an embodiment, the network hub device 132 may control the IoT devices 111_1-111_3 and 112_1-112_3 to respectively use different frequency channels or report data packets at different communication times.

Referring to FIG. 5B, before the network hub device 131 is connected to the network hub device 132 through the backup frequency channel BF1, the network hub devices 131 and 132 respectively manage the IoT devices 111_1-

111_3 and the IoT devices 112_1-112_3. The network hub device 131 respectively assigns a fourth frequency channel F1 and fourth data reporting periods T1, T2, T3 to the IoT devices 111_1-111_3 to control the IoT devices 111_1-111_3 to use the fourth frequency channel F2 to report the IoT data during the fourth data reporting periods T1, T2, T3. The network hub device 132 respectively assigns a third frequency channel F2 and third data reporting periods T1, T2, T3 to the IoT devices 112_1-112_3 to control the IoT devices 112_1-112_3 to use the third frequency channel F2 to report the IoT data during the third data reporting periods T1, T2, T3. By comparing FIG. 5A and FIG. 5B, it is known that in response to that the network hub device 131 establishes a connection with the network hub device 132 through the backup frequency channel BF1, the network hub device 132 adjusts the data reporting periods of the IoT devices 112_1-112_3, i.e., the second data reporting periods T4, T5, and T6 of the IoT devices 112_1-112_3 are different from the third data reporting time periods T1, T2, and T3 of the IoT devices 111_1-111_3.

However, the examples in FIGS. 5A and 5B are only illustrative, and in other embodiments, in response to that the network hub device 131 establishes a connection with the network hub device 132 through the spare frequency channel BF1, the network hub device 132 may also adjust the data reporting periods of the IoT devices 111_1-111_N to stagger the time when the IoT devices 111_1-111_3 report the IoT data and the time when the IoT devices 112_1-112_3 report the IoT data. Moreover, in response to that the network hub device 131 establishes a connection with the network hub device 132 through the backup frequency channel BF1, the IoT devices 111_1-111_3 and 112_1-112_3 are configured to use different data reporting periods, so that the IoT devices 111_1-111_3 and 112_1-112_3 may use the same frequency channel to report the IoT data without encountering a problem of signal interference.

Figure 6:
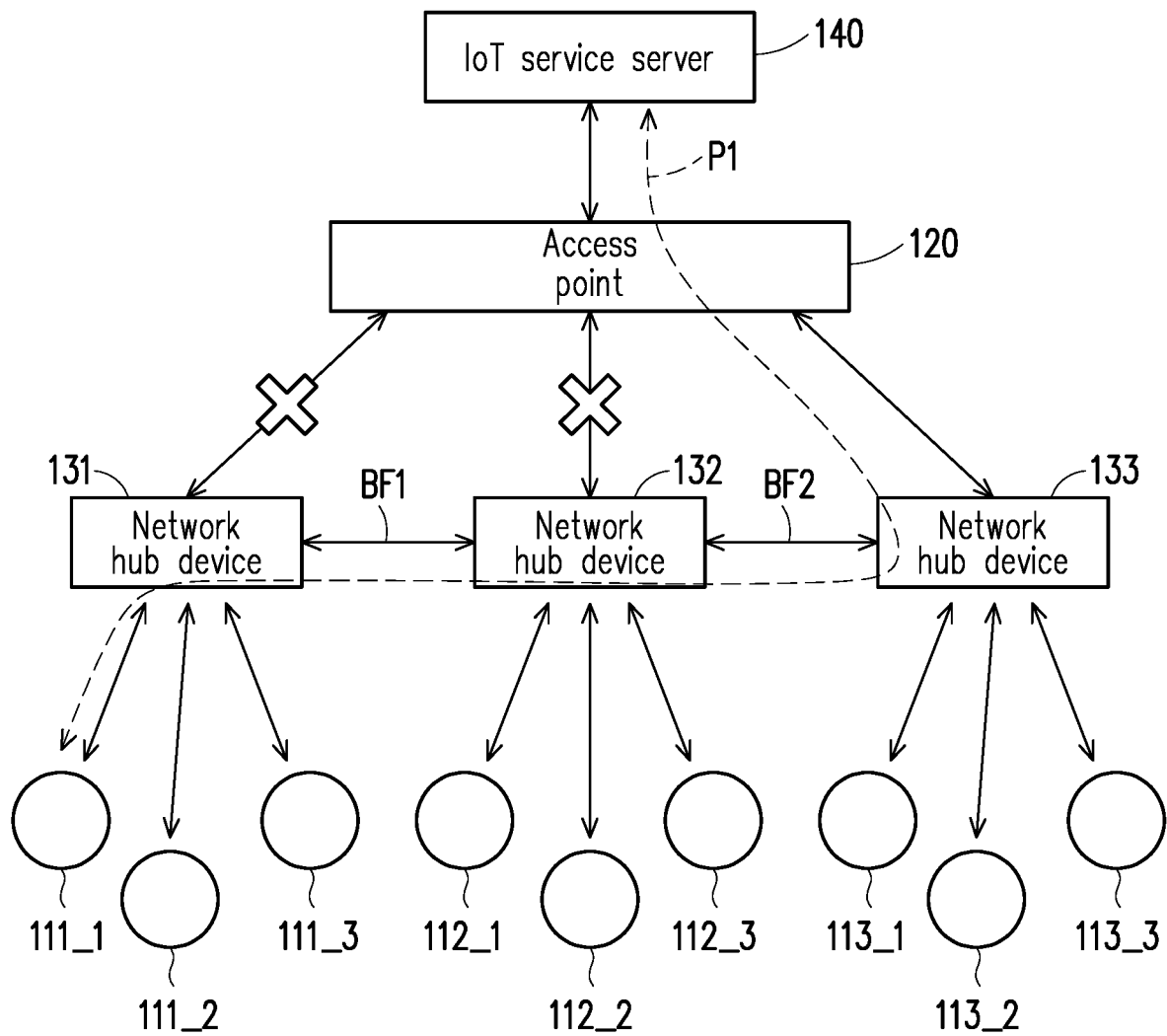
FIG. 6 is a schematic diagram of a backup channel utilization method according to an embodiment of the invention.

FIG. 6 is a schematic diagram of a backup channel utilization method according to an embodiment of the invention. Referring to FIG. 6, the IoT system 10 may further include a network hub device 133 connected to the access point 120. The network hub devices 131-133 are respectively connected to the IoT devices 111_1-111_3, 112_1-112_3, and 113_1-113_3. In an embodiment, after the network hub device 131 establishes a connection with the network hub device 132 through the backup frequency channel BF1, in response to that the connection between the network hub device 132 and the access point 120 is abnormal, the network hub device 132 may establish a connection with the network hub device 133 through another backup frequency channel BF2. Implementation details of the network hub device 132 establishing a connection with the network hub device 133 through the other spare frequency channel BF2 are similar to the implementation details of the network hub device 131 establishing a connection with the network hub device 132 through the spare frequency channel BF1, so that details thereof are not repeated. The network hub device 132 may transfer the IoT data coming from the IoT devices 111_1-111_3 and 112_1-112_3 to the network hub device 133 through the backup frequency channel BF2. In this way, the IoT data reported by the IoT devices 111_1-111_3 and 112_1-112_3 needs to be sent to the IoT service server 140 through the connection between the network hub device 133 and the access point 120. To be specific, the IoT devices 111_1-111_3 report the IoT data to the IoT service server 140 through the backup frequency channel BF1 and the other backup frequency channel BF2, i.e., the IoT data of the IoT devices 111_1-111_3 is transmitted to the IoT service server 140 through a data transmission path P1.

It should be noted that in response to that the network hub device 131 is connected to the network hub device 132 through the backup frequency channel BF1 and the network hub device 132 is connected to the network hub device 133 through the backup frequency channel BF2, the network hub device 133 may adjust the data reporting periods or/and the frequency channels allocated to the IoT devices 111_1-111_3, the IoT devices 112_1-112_3 or/and the IoT devices 113_1-112_3. In this way, a situation that too much IoT data is transmitted to the network hub device 133 at the same time to result in data loss is avoided.

Figure 7:
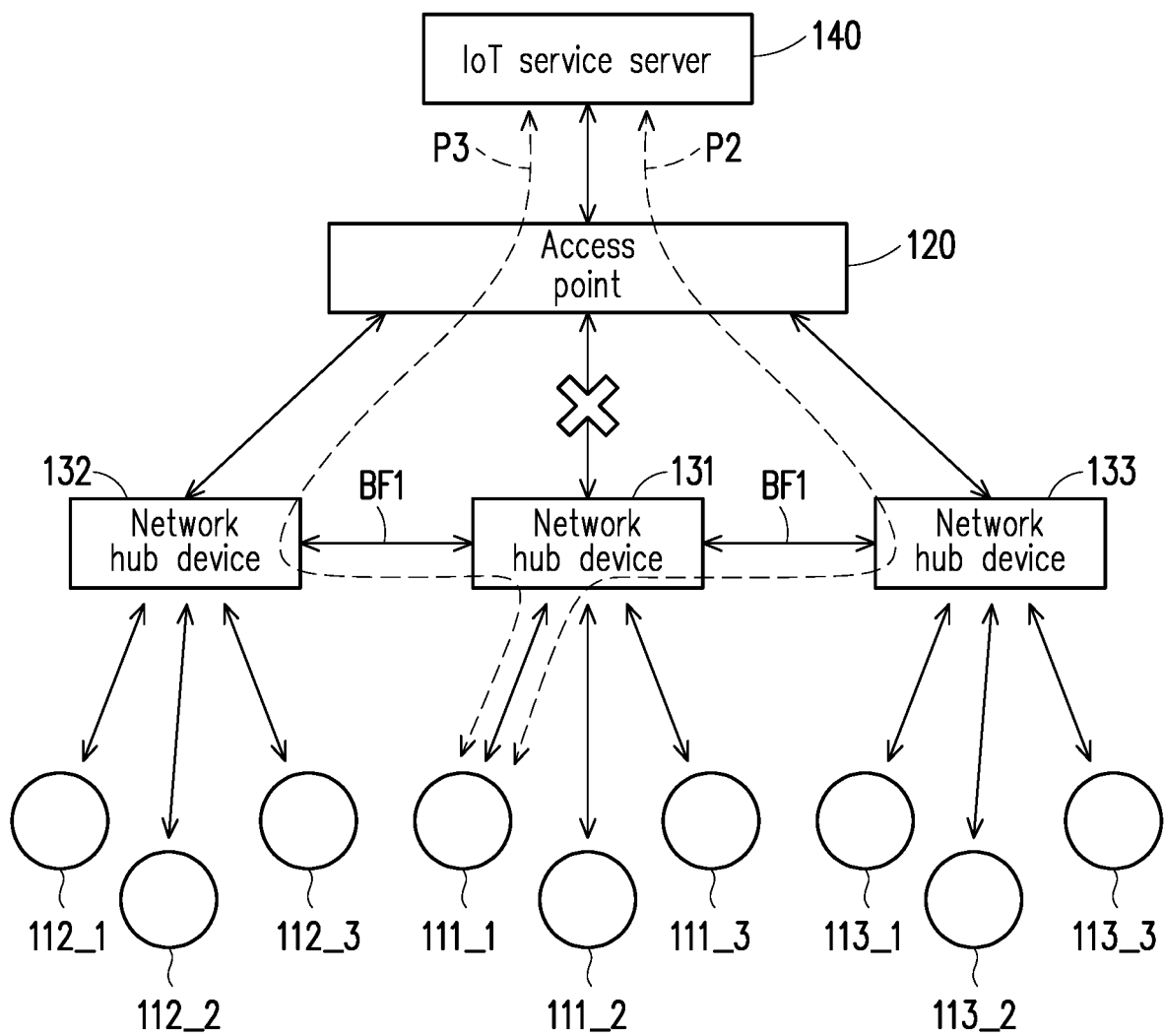
FIG. 7 is a schematic diagram of a backup channel utilization method according to an embodiment of the invention.

FIG. 7 is a schematic diagram of a backup channel utilization method according to an embodiment of the invention. Referring to FIG. 7, the IoT system 10 may further include the network hub device 133 connected to the access point 120. The network hub devices 131-133 are respectively connected to the IoT devices 111_1-111_3, 112_1-112_3, and 113_1-113_3. In an embodiment, after the network hub device 131 establishes a connection with the network hub device 132 through the backup frequency channel BF1, in response to that an amount of load of the network hub device 132 is higher than a threshold, the network hub device 131 is switched from being connected to the network hub device 132 to being connected to the network hub device 133 through the backup frequency channel BF1. The amount of load of the network hub device 132 may include the number of connections of the IoT devices 112_1-112_3 connected to the network hub device 132, a packet transmission amount of the network hub device 132 within a unit time, or the number of packets of a buffer queue in the network hub device 132, etc.

In an embodiment, in a first time period, the amount of load of the network hub device 132 is less than an amount of load of the network hub device 133, so that the network hub device 131 establishes a connection with the network hub device 132 through the backup frequency channel BF1. Then, in a second time period after the first time period, the amount of load of the network hub device 132 is changed to be greater than the amount of load of the network hub device 133, so that the network hub device 131 may be switched from being connecting to the network hub device 132 to being connected the network hub device 133 through the backup frequency channel BF1. As shown in FIG. 7, after the network hub device 131 is switched from being connected to the network hub device 132 to being connected the network hub device 133 through the backup frequency channel BF1, a data transmission path P2 of the IoT device 111_1 for reporting the IoT data is changed to a data transmission path P3.

In summary, in the embodiment of the invention, by deploying multiple network hub devices between the IoT devices and the access point, the load on the existing base station and the backhaul network may be greatly reduced. When the connection between a certain network hub device and the access point is abnormal, the network hub device may be connected to another network hub device through the backup frequency channel, so that the IoT devices managed by the network hub device may correctly report the IoT data through the backup frequency channel. In addition, when two network hub devices are connected through a backup frequency channel, the network hub device normally connected to the access point can dynamically adjust the frequency channels and the data reporting periods used by the IoT devices, thereby mitigating network congestion caused by connections of a large number of the IoT devices and reducing the probability of data collision to construct a reliable network environment for the IoT system. In this way, the network hub devices of the embodiment of the invention may be applied to different IoT services and application situations to ensure a stable, flexible and long-term development of the IoT services.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An Internet of Things (IoT) system, comprising:
a first network hub device, connected to at least one first IoT device;
a second network hub device, connected to at least one second IoT device;
at least one access point, connected to the first network hub device and the second network hub device;
an IoT service server, connected to the first network hub device and the second network hub device through the at least one access point,
wherein the first network hub device establishes a connection with the second network hub device through a backup frequency channel in response to that a connection between the first network hub device and the at least one access point is abnormal, and the first IoT device reports IoT data to the IoT service server through the backup frequency channel between the first network hub device and the second network hub device,
wherein after the first network hub device is connected to the second network hub device through the backup frequency channel, the second network hub device assigns a first frequency channel and a first data reporting period to the first IoT device and assigns a second frequency channel and a second data reporting period to the second IoT device to control the first IoT device to use the first frequency channel to report the IoT data during the first data reporting period and control the second IoT device to use the second frequency channel to report the IoT data during the second data reporting period.

2. The IoT system as claimed in claim 1, wherein after the first network hub device establishes the connection with the second network hub device through the backup frequency channel, the IoT service server sends a control message to the first IoT device through the backup frequency channel between the first network hub device and the second network hub device.

3. The IoT system as claimed in claim 1, wherein the first network hub device selects the second network hub device from a plurality of neighboring network hub devices according to location information or load states of the neighboring network hub devices.

4. The IoT system as claimed in claim 1, wherein the first data reporting period of the first IoT device is different from the second data reporting period of the second IoT device.

5. The IoT system as claimed in claim 1, wherein before the first network hub device is connected to the second network hub device through the backup frequency channel, the second network hub device assigns a third frequency channel and a third data reporting period to the second IoT device to control the second IoT device to use the third frequency channel to report the IoT data during the third data reporting period.

6. The IoT system as claimed in claim 5, wherein the second data reporting period of the second IoT device is different from the third data reporting period of the second IoT device.

7. The IoT system as claimed in claim 1, wherein the second network hub device dynamically adjusts the first frequency channel and the first data reporting period of the first IoT device and the second frequency channel and the second data reporting period of the second IoT device according to a data reporting state of the first IoT device and a data reporting state of the second IoT device.

8. The IoT system as claimed in claim 1, further comprising a third network hub device connected to the at least one access point, wherein in response to that a connection between the second network hub device and the at least one access point is abnormal, the second network hub device establishes a connection with the third network hub device through another backup frequency channel, and the first IoT device reports the IoT data to the IoT service server through the backup frequency channel and the another backup frequency channel.

9. The IoT system as claimed in claim 1, further comprising a third network hub device connected to the at least one access point, wherein in response to that an amount of load of the second network hub device is higher than a threshold, the first network hub device is switched from being connected to the second network hub device to being connected to the third network hub device through the backup frequency channel.

10. A backup channel utilization method, adapted to an IoT system, the backup channel utilization method comprising:
establishing a connection between at least one first IoT device and a first network hub device, and establishing a connection between the first network hub device and at least one access point;
establishing a connection between at least one second IoT device and a second network hub device, and establishing a connection between the second network hub device and the at least one access point;
establishing a connection with the second network hub device by the first network hub device through a backup frequency channel in response to that the connection between the first network hub device and the at least one access point is abnormal; and
reporting IoT data of the first IoT device to an IoT service server through the backup frequency channel between the first network hub device and the second network hub device,
wherein the step of reporting the IoT data of the first IoT device to the IoT service server through the backup frequency channel between the first network hub device and the second network hub device comprises:
assigning a first frequency channel and a first data reporting period to the first IoT device and assigning a second frequency channel and a second data reporting period to the second IoT device by the second network hub device after the first network hub device is connected to the second network hub device through the backup frequency channel to control the first IoT device to use the first frequency channel to report the IoT data during the first data reporting period and control the second IoT device to use the second frequency channel to report the IoT data during the second data reporting period.

11. The backup channel utilization method as claimed in claim 10, further comprising:
sending a control message to the first IoT device by the IoT service server through the backup frequency channel between the first network hub device and the second network hub device after the first network hub device establishes the connection with the second network hub device through the backup frequency channel.

12. The backup channel utilization method as claimed in claim 10, wherein before the step of establishing the connection with the second network hub device by the first network hub device through the backup frequency channel in response to that the connection between the first network hub device and the at least one access point is abnormal, the backup channel utilization method further comprises:
selecting the second network hub device from a plurality of neighboring network hub devices by the first network hub device according to location information or load states of the neighboring network hub devices.

13. The backup channel utilization method as claimed in claim 10, wherein the first data reporting period of the first IoT device is different from the second data reporting period of the second IoT device.

14. The backup channel utilization method as claimed in claim 10, further comprising:
assigning a third frequency channel and a third data reporting period to the second IoT device by the second network hub device before the first network hub device is connected to the second network hub device through the backup frequency channel to control the second IoT device to use the third frequency channel to report the IoT data during the third data reporting period.

15. The backup channel utilization method as claimed in claim 14, wherein the second data reporting period of the second IoT device is different from the third data reporting period of the second IoT device.

16. The backup channel utilization method as claimed in claim 10, further comprising:
dynamically adjusting the first frequency channel and the first data reporting period of the first IoT device and the second frequency channel and the second data reporting period of the second IoT device by the second network hub device according to a data reporting state of the first IoT device and a data reporting state of the second IoT device.

17. The backup channel utilization method as claimed in claim 10, wherein after the step of reporting the IoT data of the first IoT device to the IoT service server through the backup frequency channel between the first network hub device and the second network hub device, the backup channel utilization method further comprises:
establishing a connection with a third network hub device by the second network hub device through another backup frequency channel in response to that the connection between the second network hub device and the at least one access point is abnormal, wherein the third network hub device is connected to the IoT service server through the at least one access point; and
reporting the IoT data of the first IoT device to the IoT service server through the backup frequency channel and the another backup frequency channel after the second network hub device establishes the connection with the third network hub device through the another backup frequency channel.

18. The backup channel utilization method as claimed in claim 10, wherein after the step of reporting the IoT data of the first IoT device to the IoT service server through the backup frequency channel between the first network hub device and the second network hub device, the backup channel utilization method further comprises:
switching the first network hub device from being connected to the second network hub device to being connected to a third network hub device through the backup frequency channel in response to that an amount of load of the second network hub device is higher than a threshold, wherein the third network hub device is connected to the IoT service server through the at least one access point.

* * * * *

UNITED STATES PATENT AND TRADEMARK OFFICE
CERTIFICATE OF CORRECTION

| | |
|---|---|
| PATENT NO. | : 11,659,025 B2 |
| APPLICATION NO. | : 17/529298 |
| DATED | : May 23, 2023 |
| INVENTOR(S) | : Chan-Ping Po |

It is certified that error appears in the above-identified patent and that said Letters Patent is hereby corrected as shown below:

On the Title Page

Item (73) Assignee please add: ACER BEING COMMUNICATION INC., TAIPEI CITY (TW); Acer Incorporated, New Taipei City (TW)

Signed and Sealed this
Fourth Day of July, 2023

Katherine Kelly Vidal
*Director of the United States Patent and Trademark Office*